United States Patent [19]

Holt et al.

[11] Patent Number: 4,580,830
[45] Date of Patent: Apr. 8, 1986

[54] TRAILER

[75] Inventors: Joseph C. Holt, Veedersburg; Russell L. Losh, Rensselaer, both of Ind.

[73] Assignee: Talbert Manufacturing, Inc., Rensselaer, Ind.

[21] Appl. No.: 637,958

[22] Filed: Aug. 6, 1984

[51] Int. Cl.⁴ .............................................. B62D 27/02
[52] U.S. Cl. .................................. 296/182; 280/43.11
[58] Field of Search .............................. 296/182, 181; 280/43.11 X, 43.17, 43.22, 43.23, 43.19; 105/370; 414/538, 505

[56] References Cited

U.S. PATENT DOCUMENTS

| | | | |
|---|---|---|---|
| 2,653,827 | 9/1953 | Manning | 280/43.11 |
| 2,687,225 | 8/1954 | Martin | 214/505 |
| 2,776,146 | 1/1957 | Marino | 280/43.11 |
| 4,290,642 | 9/1981 | Wise | 296/182 |
| 4,302,022 | 11/1981 | Schoeffler et al. | 280/43.19 |

Primary Examiner—Robert R. Song
Attorney, Agent, or Firm—Barnes & Thornburg

[57] ABSTRACT

A trailer is disclosed having a forward section, a middle section, and a rearward section. The forward section is adapted to be attached to the fifth wheel of a tractor while the rearward section supports the trailer on a set of wheels. The middle section extending between the forward and rearward section is positionable in at least two load-transporting positions at different heights above the ground. The forward and rearward sections each include fixed oblique support elements and locking pins for securing the middle section to the fixed oblique support elements at each of the load-transporting positions. Fluid-actuated cylinders are provided for moving the middle section between the load-transporting positions.

19 Claims, 7 Drawing Figures

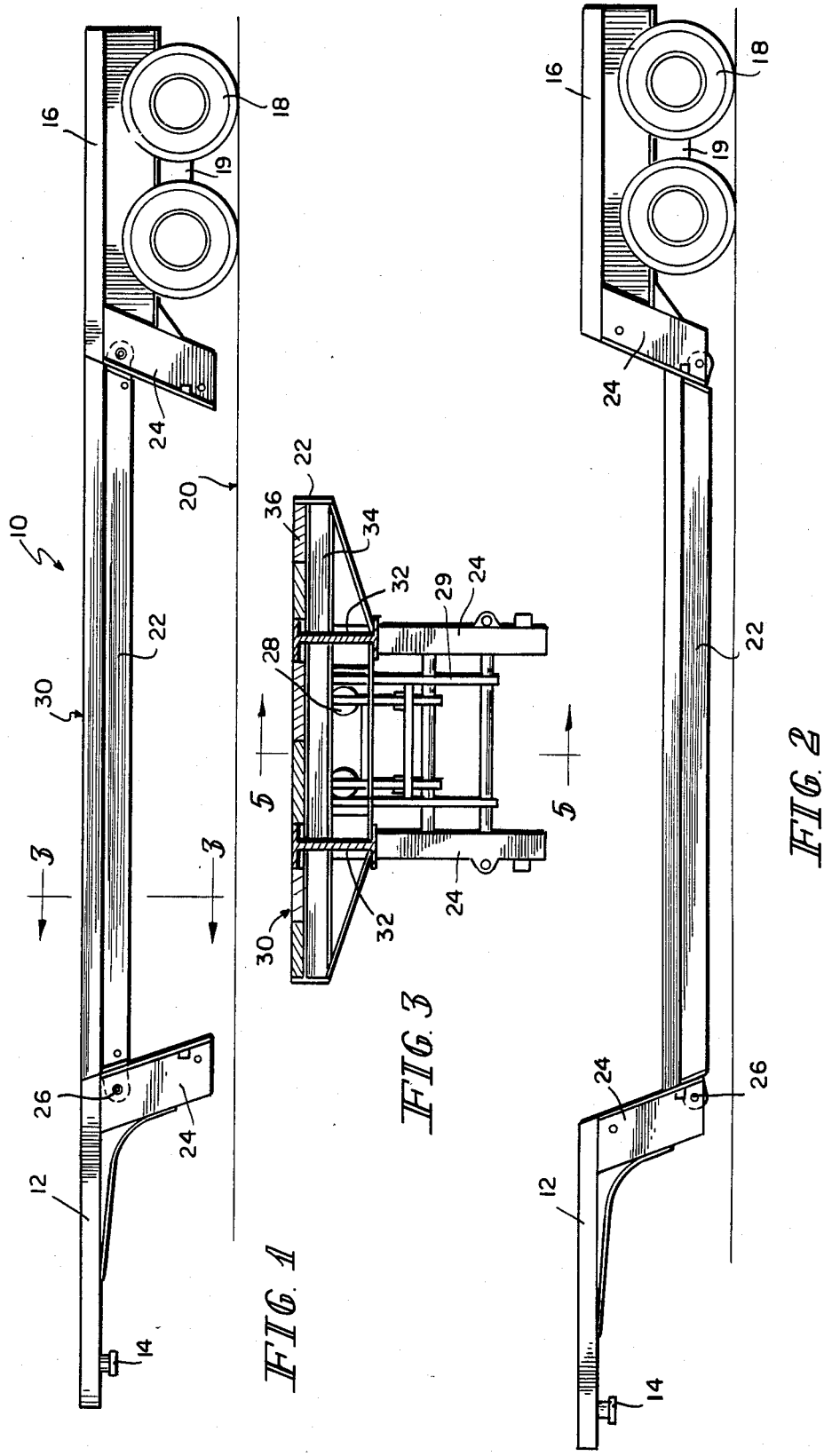

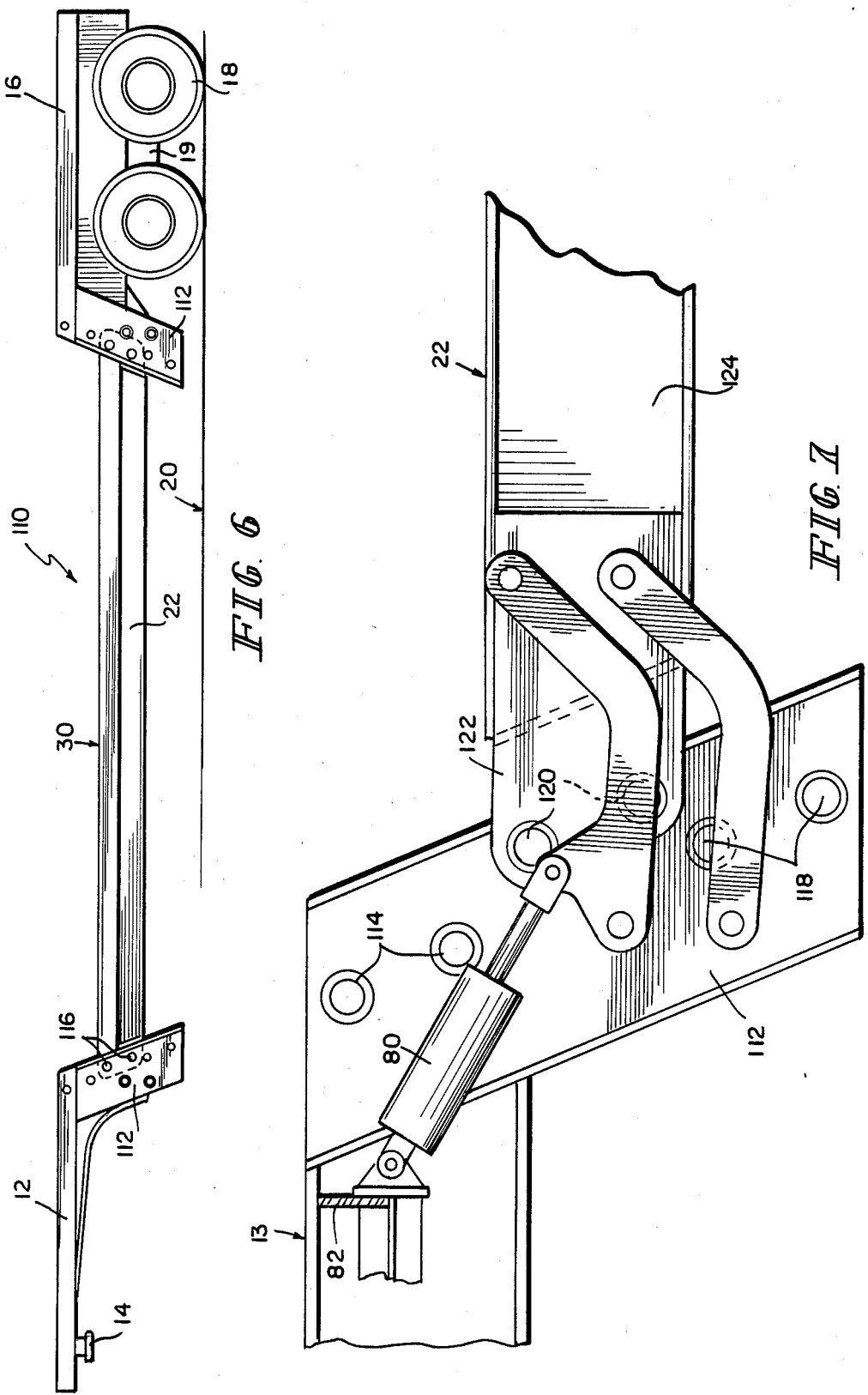

TRAILER

The present invention relates generally to the field of wheeled land vehicles and in particular to cargo-carrying trailers designed to be removably attached to a fifth wheel of a tractor or cab. The invention is particularly directed to such a trailer which includes means for positioning the cargo-carrying surface of the trailer in at least two load-transporting positions at different heights above the ground.

Trailers are conventionally classified into one of several categories based principally on their physical construction and the relationship of that construction to its load-carrying capabilities. Examples of types of trailers are tank trailers for carrying liquid materials, bulk commodity trailers generally of the hopper type, pole or logging trailers, dump trailers, automobile transport trailers, etc. Of particular interest to the present invention are platform or flatbed trailers and lowbed trailers. A flatbed or platform type trailer has a deck or load-carrying surface which is at a fixed height along the entire length of the trailer, that height typically being about 4.5 feet (1.4 meters) above the road surface. Such trailers are well adapted for hauling a wide variety of loads, particularly loads which are able to withstand weather, may be long and rather low such as pipe, drill casting, etc. On the other hand, a flatbed type trailer cannot haul an overly high load due to the lack of clearance presented by overpasses, bridges, and the like.

When one is faced with transporting a tail load, one typically employs a lowbed trailer. A lowbed trailer generally has a forward section which is at the normal height of the flatbed trailer but has a center section between the forward section and the rear wheels which is significantly lower, generally only about 2 feet (0.6 meters) above the road surface. This lowbed trailer can easily haul tail or high loads which could not be transported on flatbed trailers. On the other hand, such a lowbed trailer is generally thought to be unsatisfactory for many loads which are long and which require support along their entire length so as to avoid deformation of the load under its own weight. Thus, it may be seen that both a flatbed type and a lowbed type trailer has unique advantages which permit its use in situations where use of the other type of trailer is inadvisable or impossible.

A particular problem is encountered when one selects either a flatbed or lowbed trailer to haul a particular load from a first location to a second location many hundreds or thousands of miles away. Once the trailer has been selected, and the load delivered, it is then necessary that the driver either locate another suitable load for the trailer for the return trip, which is often difficult and time-consuming, or return empty. This returning empty or deadheading is costly, totally unproductive, and to be avoided if at all possible. The situation could be avoided if one had a trailer having a load carrying surface which was movable between the lowbed and flatbed positions so as to adjust its suitability for various types of loads.

One such trailer is disclosed in Schoeffler et al U.S. Pat. No. 4,302,022. The Schoeffler trailer has a front section of the usual height adapted to connect with a tractor in the usual fashion. A rear section is provided which can be moved relative to the forward section and moved on a linkage mechanism relative to the supporting rear wheels. The Schoeffler design requires the rear wheels be provided with an extremely low carriage structure so as to permit the rear portion of the trailer to be lowered to the lowbed position. In practice, such a small carriage structure is neither practical nor suitable for carrying the heavy loads typically carried by such trailers.

A trailer in accordance with the present invention includes a forward section having a kingpin for attachment to the fifth wheel of a tractor in the conventional fashion. A rearward section is provided which includes a set of wheels for supporting the trailer on the ground, the rearward section having little or no vertical movability. A middle section is provided which extends between the forward and rearward sections and is positionable in at least two load-transporting positions at different heights above the ground. At the uppermost position, the middle section would preferably be situated so as to form a flatbed trailer while at its lowermost position the middle section would be at the conventional height of a lowbed trailer. The forward and rearward sections of the trailer in accordance with the present invention each include fixed oblique support elements. The trailer includes a locking mechanism for securing the middle section to the fixed oblique support elements at each of the load-transporting positions. A linkage means is provided for guiding the middle section as it is moved between positions such that the three sections of the trailer are maintained substantially parallel to each other. A power mechanism is provided for moving the middle section between the various load-transporting positions.

Generally, the fixed oblique support elements on the forward and rearward sections are provided as end structures to the longitudinal support beams of each section. Longitudinal support beams of the middle section are adapted to contact the oblique support elements and engage the same in the load-transporting positions. Generally, the power mechanism provided for moving the middle section relative to the two end sections would not be relied upon to support the load but rather the load would be supported in the various positions by the locking mechanism locking and the middle section to the two end sections. This has the advantage of permitting the inclusion of smaller power elements which need only to be large enough to move the weight of the middle section itself rather than support the heavy loads typically carried by such a trailer. When the locking means is in position, the beam structure of the trailer is essentially similar to conventional trailers in having the usual structure of either a flatbed or lowbed trailer. This has the advantage also of permitting the trailer to carry loads of various sizes and weights fully equivalent with both the conventional flatbed and lowbed type trailers.

Additional features and advantages of the invention will become apparent to those skilled in the art upon consideration of the following detailed description of preferred embodiments exemplifying the best mode of carrying out the invention as presently perceived. The detailed description particularly refers to the accompanying figures.

FIG. 1 is a side elevation view of a trailer embodying the present invention showing it in its upper or flatbed configuration.

FIG. 2 is a side elevation of the same trailer shown in FIG. 1 but situated in its lower or lowbed configuration.

FIG. 3 is a sectional view of the trailer shown in FIG. 1 taken along lines 3—3.

FIG. 6 is side elevation view of a second embodiment of the present invention showing the middle section in an intermediate position.

FIG. 7 is a sectional detail view of the embodiment shown in FIG. 6 similar to FIG. 5.

Figure 4:
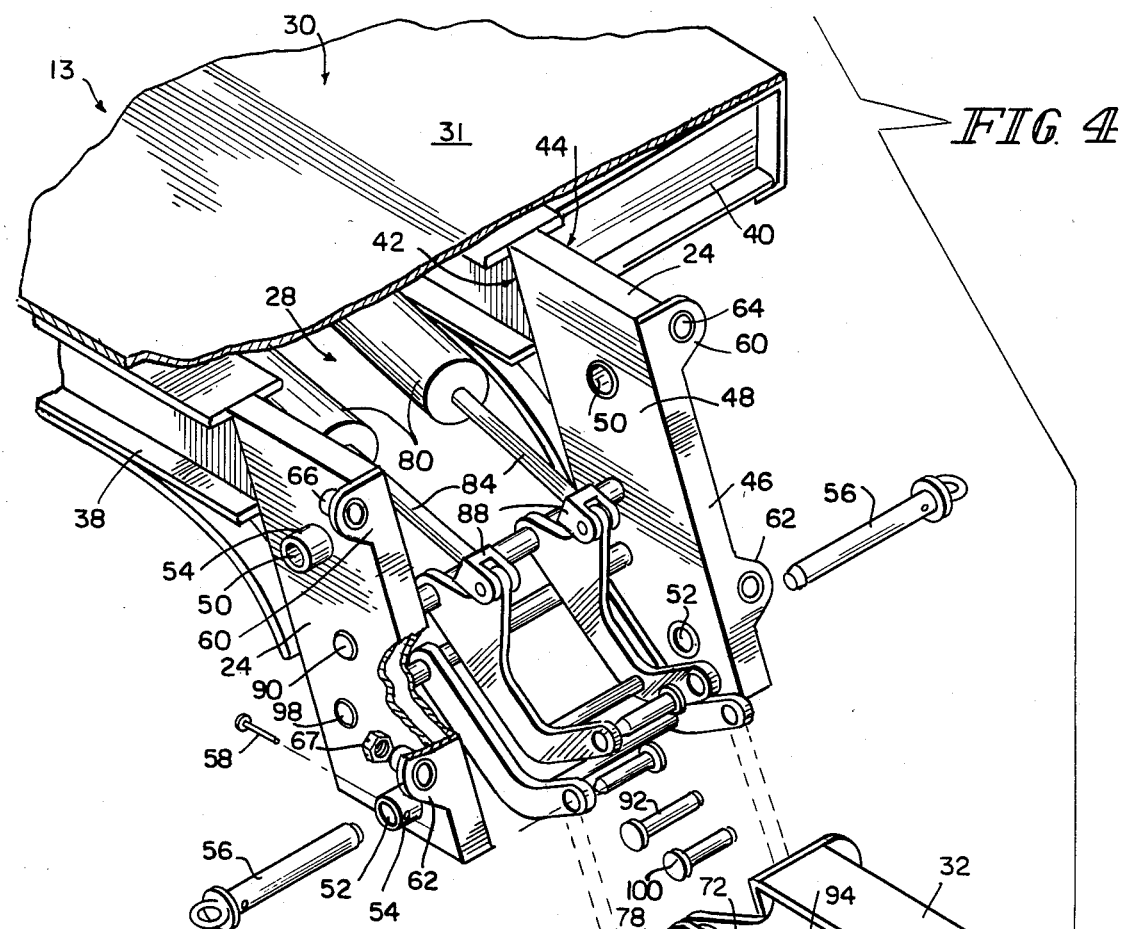
FIG. 4 is an exploded perspective view of the trailer showing the connection between the longitudinal support beams of the middle section and one of the two end sections.

In accordance with the present invention, a trailer 10 includes a forward section 12 having a kingpin 14 which permits attachment of the forward section 12 to the fifth wheel of a conventional tractor (not illustrated). A rearward section 16 is provided which includes a set of wheels 18 for supporting the trailer on the ground. The wheels 18 and related carriage structure 19 are preferably of a size and weight suitable for carrying heavy loads of from ten to forty tons. The rear wheels 18 support the trailer with respect to the ground 20 such that the top or deck 30 of the forward section 12 and rearward section 16 are at substantially the same height, typically 4.5 feet (1.4 meters) above the ground 20.

The trailer also includes a middle section 22 which extends between the forward section 12 and rearward section 16. The middle section 22 is positionable in at least two load-transporting positions at different heights above the ground 20. The middle section 22 is shown in FIG. 1 at an uppermost position so as to form the functional equivalent of a conventional flatbed or platform trailer. The middle section 22 is shown in FIG. 2 in a lowermost load-transporting position functionally equivalent with a conventional drop-deck trailer.

Oblique support elements 24 are fixed to both the forward section 12 and the rearward section 16 and act to support the middle section 22. Locking means 26 such as pins are provided for securing the middle section 22 to the fixed oblique support elements 24 at each of the load-transporting positions. A power means 28 is provided for moving the middle section 22 between the various load-transporting positions while the locking means is disengaged. A linkage means 29 is provided for maintaining adjacent sections of the trailer in substantially parallel relationship while moving between the various load-transporting positions.

As shown best in FIG. 3, the middle section 22 includes a pair of longitudinal support beams 32 which are substantially aligned with the oblique support elements 24 provided on each end section 12 and 16. A plurality of smaller transverse beams 34 are provided which provide support for a top surface or deck 30. The top surface is shown in FIG. 3 to comprise a plurality of wood planks 36 but other suitable materials may be employed. Additional surface elements can be provided for closing any open areas between the sections when the middle section 22 is not in the upper position shown in FIG. 1.

Figure 5:
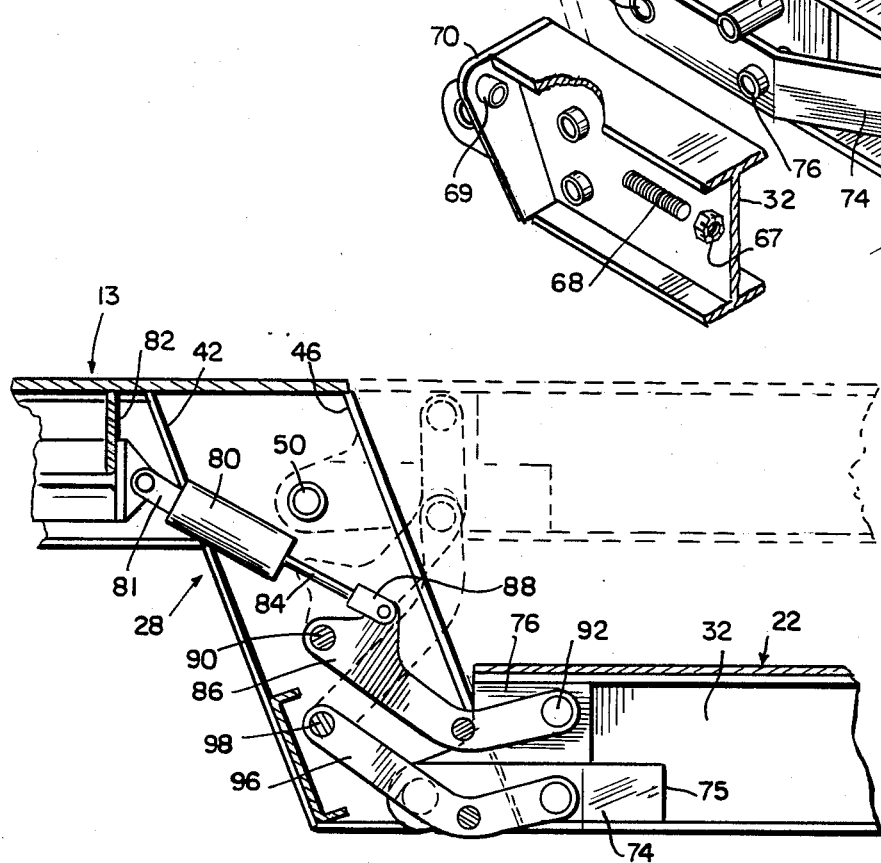
FIG. 5 is a sectional detail view taken from FIG. 3 along line 5—5.

As best shown in FIG. 4, the end sections 12 and 16 also include longitudinal support beams 38 to which the oblique support elements 24 are fixed. The end section 13 shown in FIG. 4 may be either the forward section 12 or the rearward section 16 as the mechanisms of each end are the same. The deck 30 is illustrated in FIGS. 4 and 5 to be a single sheet of steel plate 31 but could be of any other conventional construction including that shown in FIG. 3. The end section 13 includes transverse beams 40 similar to the transverse beams 34 shown in FIG. 3.

The oblique support elements 24 are formed from a box beam which can be constructed from four plate members 42–48 which are butt welded together and in turn welded to the ends of the longitudinal support beams 38 of the end units 13. The oblique support elements 24 include a pair of pin-receiving apertures 50 and 52 defined by cylindrical inserts 54. The cylindrical inserts 54 have an inside diameter such as will receive support pins 56. The support pins 56 are in turn secured in place by a keeper 58. The face plate 46 of oblique support element 24 includes tabs 60 and 62. Each tab includes a locating aperture 64 lined with a cylindrical member 66 having an inside diameter sized to receive a locating rod 68. The rod 68 preferably is threaded with a castellated nut 67 removably secured on each end thereof. The locating rod extends through cylindrical members 69 on face plate 70 welded to the end of the longitudinal support beams 32 of the middle section 22. Near the end of each longitudinal support beam 32 of the middle section 22 there is a tongue member 72 which extends beyond the face plate from the inside surface of the longitudinal support beam 32. This tongue member 72 is strengthened by strap 74 arranged in essentially parallel fashion to the tongue member 72. The rear end 75 of strap 74 is welded to the web 33 of the longitudinal support beam 32 and is fixed to tongue 72 by cylindrical members 76 and 78.

Cylindrical member 78 is positioned such that the inner end of support pin 56 is received within the cylindrical member 78 when the middle section 22 is properly positioned in a load-carrying position such as that illustrated in FIGS. 1 or 2. The pin 56 extends through cylindrical insert 54 in the oblique support element 24 into cylindrical member 78 in tongue 72 and strap 74 so as to secure the middle section to the fixed oblique support elements 24.

The power means 28 comprises a fluid-actuated cylinder 80 having an end 81 fixed to the frame 82 of end unit 13. The fluid-actuated cylinder 80 acts on a piston contained therein to move the piston rod 84 which is in turn pivotally connected to lever arm 86 by way of connection 88. As shown most clearly in FIGS. 3 and 4, each end unit 13 includes a pair of the fluid-actuated cylinders and associated structures adjacent each other but the illustrated pair of members might easily be replaced by a single member of appropriate size and strength.

The pivot connection 88 couples the end of the piston rod 84 to lever arm 86 in such a fashion as to form a third class lever. That is, the force developed by the fluid-actuated cylinder 80 is applied to the lever between the fulcrum defined by pivot rod 90 and the weight or load of the middle section 22 secured by pivot pin 92. The pivot rod 90 extends between the two parallel adjacent oblique support elements 24. The pivot pin 92 extends through the end of lever 86 into receiving cylinder 94 fixed through the tongue 72 and web 33 of longitudinal support beam 32 of the middle section 22.

Additional linkage means 29 in the form of pivot arms 96 are provided immediately below the lever arm 86. The pivot arms 96 are pivotally connected to the oblique support elements 24 by pivot rod 98. The pivot arms 96 are connected to the middle section 22 by means of pivot pins 100 passing through the ends of the arms 96 into cylindrical member 76 passing through strap 74 and web 33 of the longitudinal support beam 32. The pivot arms 96 act in conjunction with the lever arms 86 to define a parallelogram-like structure which maintains adjacent sections of the trailer substantially parallel as the middle section is moved between load-transporting positions.

In operation, when the middle section 22 is in the lower position as shown in FIGS. 2 and 5, the support pins 56 secure the tongue member 72 and adjacent strap 74 to the oblique support elements 24. The weight of the middle section 22 as well as any load placed on that section is carried by the support pins 56 as well as the facing plate member 46 which contacts the face plate 70 on the end of the longitudinal support beam 32 of the middle section 22.

To move the middle section from the lower position shown in FIG. 2 to the upper position shown in FIG. 1, the keeper 58 is removed so as to permit the support pin 56 to be extracted from lower aperture 52. The locating rod 68 is removed from the locating aperture 64 in tab 62. This frees the middle section 22 so that it may be moved from the position shown in solid lines in FIG. 5 to the position shown in phantom in FIG. 5. This motion is achieved by actuating the fluid-actuated cylinder 80 so as to pull on piston rod 84 thus causing the lever arm 86 to pivot upwardly about pivot rod 90 until the face plate 70 at the end of the longitudinal support beam 32 contacted the upper portion of face plate member 46 of the oblique support element 24. As the middle section 22 is moved from its lower position to its upper position, the rear section 16 will be pulled forward (assuming front section 12 remains stationary). At this point, the aperture defined by cylindrical member 78 would be coincident with the upper aperture 50. The locating rod 68 is inserted in the locating aperture 64 in tab 60 and the support pin 56 is inserted through aperture 50 into cylindrical member 78 so as to secure the middle section 22 in the upper position shown in phantom in FIG. 5. During this movement from the lower position to the upper position, the lever arms 86 and pivot arms 96 have moved from a substantially horizontal position as shown in solid lines in FIG. 5 to a substantially vertical position as shown in phantom in FIG. 5 thus maintaining the middle section 22 parallel to the end sections 13.

FIGS. 6 and 7 illustrate an alternative embodiment of the present invention wherein there is provided an intermediate position between the upper position and lower position shown in FIGS. 1 and 2, respectively. The trailer 110 is shown in FIG. 6, and in more detail in FIG. 7, to include oblique support elements 112 which include three sets of locking apertures 114, 116, and 118. Each pair of locking apertures 114, 116, 118 cooperates with a similarly situated pair of apertures 120 on the end of tongue 122 extending outward from longitudinal support beam 124 of middle section 22. Each pair of apertures is designed to receive a pair of locking pins substantially identical as locking pins 56 shown in FIG. 4. In general, the illustrated intermediate position would locate the deck 30 of middle section 22 approximately 3.25 feet (1 meter) above the ground 20. This intermediate position is particularly useful for carrying loads having modest vertical dimension on a distributed basis such that a portion of the load is on the middle section 22 while the remainder of the load is located either on the forward section 12 or rearward section 16 of the trailer.

Generally, the remaining details of structure and function of the embodiment shown in FIGS. 6 and 7 is the same as that shown in FIGS. 1-5. In both embodiments, the fluid-actuated cylinders 80 are provided by fluid from an external source of pressure (not illustrated) which can be mounted either on the trailer or connected to an appropriate system available on conventional tractors. In general, a simple control system would be mounted on the trailer which would permit the raising and lowering of the intermediate section is a simple and convenient manner by the truck operator. The raising and lowering of the middle section would result in a shortening or lengthening of the trailer, respectively. In both embodiments, once the middle section 22 had been positioned at the desired height above the ground 20 and the support pins 56 inserted, the weight of the middle section 22 would be supported principally by the support pins 56 while the fluid-actuated cylinders 80 would be permitted to relax to an unloaded condition, thereby relieving any stresses which might otherwise be placed on the fluid-actuated cylinder 80 and the supporting frame structure 82.

Although the invention has been described in detail with reference to certain preferred embodiments, variations and modifications exist within the scope and spirit of the invention as described and as defined in the following claims.

What is claimed is:

1. A trailer comprising a forward section including a kingpin for attachment to a fifth wheel of a tractor, a rearward section including a set of wheels for supporting the trailer on the ground, and a middle section extending between the forward and rearward sections and positionable in at least two load-transporting positions at different heights above the ground, the forward and rearward sections each including fixed oblique support elements cooperating to define means for drawing the forward and rearward sections toward one another during movement of the middle section from a lower load-transporting position a first height above the ground and an elevated load-transporting position a relatively higher second height aboved the ground, locking means for securing the middle section to the fixed oblique support elements at each of the load-transporting positions, and power means for moving the middle section between the load-transporting positions.

2. The trailer of claim 1 further comprising linkage means for maintaining the middle section substantially parallel to the forward and rearward sections as the middle section is moved between the load-transporting positions.

3. The trailer of claim 1 wherein the forward and rearward sections each include longitudinal support beams, the oblique support elements being fixed to the ends of the longitudinal support beams.

4. The trailer of claim 3 wherein the middle section includes longitudinal support beams substantially aligned with the longitudinal support beams of the forward and rearward sections, and oblique faces on the ends of the middle section longitudinal support beams adapted to contact the oblique support elements of the forward and rearward sections.

5. The trailer of claim 1 wherein the forward and rearward sections each include a pair of spaced parallel oblique support elements, the power means being situated on the forward and rearward sections between the support elements thereof.

6. A trailer comprising a forward section including a kingpin for attachment to a fifth wheel of a tractor, a rearward section including a set of wheels for supporting the trailer on the ground, and a middle section extending between the forward and rearward sections and positionable in at least two load-transporting positions at different heights above the ground, the forward and rearward sections each including fixed oblique support elements, locking means for securing the middle section to the fixed oblique support elements at each of the load-transporting positions, power means for moving the middle section between the load-transporting positions, and wherein the forward and rearward sections each include longitudinal support beams, the oblique support elements being fixed to the ends of the longitudinal support beams, the middle section includes longitudinal support beams substantially aligned with the longitudinal support beams in the forward and rearward sections, the middle section support beams including at each end laterally displaced tongues extending beside the support beams of the forward and rearward section, the locking means securing the tongues to adjacent oblique support elements.

7. The trailer of claim 6, wherein the locking means comprises pins passing through apertures in the laterally displaced tongues and oblique support elements, the apertures being situated so as to define each of the load-transporting positions.

8. The trailer of claim 7 wherein the apertures are situated such that an uppermost load-transporting position is defined wherein a top surface of the forward, rearward, and the middle sections are substantially coplanar.

9. The trailer of claim 8, wherein the apertures are situated such that the trailer has three load-transporting positions, the lowermost position being such that a bottom surface of the middle section support beams is substantially coincident with a bottom surface of the oblique support elements.

10. A trailer comprising a forward section including a kingpin for attachment to a fifth wheel of a tractor, a rearward section including a set of wheels for supporting the trailer on the ground, and a middle section extending between the forward and rearward sections and positionable in at least two load-transporting positions at different heights above the ground, the forward and rearward sections each including fixed oblique support elements, locking means for securing the middle section to the fixed oblique support elements at each of the load-transporting positions, the power means including a fluid-actuated cylinder coupled to a lever arm, the lever arm linking the middle section to one of the adjacent sections, and linkage means for maintaining the middle section substantially parallel to the forward and rearward sections as the middle section is moved between the load-transporting positions.

11. The trailer of claim 10, wherein the lever arm is connected to the fluid-actuated cylinder, the middle section, and adjacent section so as to form a third-class lever.

12. The trailer of claim 10, wherein said linkage means comprises a pivot arm parallel to each lever arm and coupling the middle section to an adjacent section, the pivot arm being situated so as to move parallel with the lever arm.

13. The trailer of claim 12 wherein the lever arm and pivot arm are each pivotally connected to an adjacent oblique support element.

14. A trailer comprising a forward section including a kingpin for attachment to a fifth wheel of a tractor, a rearward section including a set of wheels for supporting the trailer on the ground, and a middle section extending between the forward and rearward sections and positionable in at least two load-transporting positions at different heights above the ground, the forward and rearward sections each including a pair of spaced parallel fixed oblique support elements, locking means for securing the middle section to the fixed oblique support elements at each of the load-transporting positions, and power means for moving the middle section to the fixed oblique support elements at each of the load-transporting positions, the power means being situated on the forward and rearward sections between the support elements thereof and including a pair of fluid-actuated cylinders, each cylinder being coupled to a lever arm linking the middle section to one of the adjacent sections, each lever being pivotally connected to an adjacent oblique support element and fixed to an adjacent lever arm to move in tandem therewith.

15. The trailer of claim 14, further comprising pivot arms pivotally coupling the middle section to the forward and rearward sections, the pivot arms being adapted to move in tandem with the lever arm.

16. A trailer for use on a road or other underlying surface, the trailer comprising
a frame including a forward section and a rearward section laterally spaced apart from the forward section,
a middle section received between the forward and rearward sections, the middle section having at least a first position elevated above the underlying surface and a second position elevated above the first position,
oblique support elements fixed to and extending downward and inward from the forward and rearward sections for supporting the middle section at the prescribed positions,
locking means for supporting the middle section in the at least first and second positions, and
linkage means for guiding the middle section from one of its positions to another of its positions maintaining the sections in substantially parallel relation to each other, the oblique support elements in the linkage means cooperating to define means for drawing the forward and rearward sections toward one another during movement of the middle section from its first position toward its second position.

17. The trailer of claim 16 further comprising power means for moving the middle section from one of its positions to another of its positions.

18. The trailer of claim 16 wherein the middle section includes a substantially flat deck and the linkage means includes
a pair of forward linkage assemblies journaled for pivotal movement to the forward section,
a pair of rearward linkage assemblies journaled for pivotal movement to the rearward section, and
means for coupling the journaled forward linkage assemblies and the journaled rearward linkage assemblies to the middle section to cause the middle section to be movable along a selected path from one of its positions to another of its positions such that the deck of the middle section is substantially parallel to the plane of the underlying surface when the middle section arrives at each of said positions.

19. The trailer of claim 16 wherein the linkage means comprises pairs of arms pivoted to the middle section and to the adjacent sections so as to define between each two adjacent section a parallelogram-like structure.

* * * * *

UNITED STATES PATENT AND TRADEMARK OFFICE
CERTIFICATE OF CORRECTION

PATENT NO. : 4,580,830

DATED : April 8, 1986

INVENTOR(S) : Joseph C. Holt

It is certified that error appears in the above-identified patent and that said Letters Patent is hereby corrected as shown below:

In the abstract, Line 8, replace "section" with -- sections --.

In Col. 1, Line 27, replace "casting" with -- casing --.

In Col. 1, Lines 31 and 38, replace "tail" with -- tall --.

In Col. 6, Line 7, replace "is" with -- in --.

Signed and Sealed this

Eighteenth Day of November, 1986

Attest:

DONALD J. QUIGG

*Attesting Officer*  *Commissioner of Patents and Trademarks*